United States Patent Office 3,321,535
Patented May 23, 1967

3,321,535
PROCESS FOR DIBENZO[a,d]CYCLOHEPTA[1.4]DI-
ENE INTERMEDIATES
Lynn R. Peters, Indianapolis, and George F. Hennion,
South Bend, Ind., assignors to Eli Lilly and Company,
Indianapolis, Ind., a corporation of Indiana
No Drawing. Original application Aug. 10, 1962, Ser.
No. 216,029, now Patent No. 3,281,469, dated Oct. 25,
1966. Divided and this application Oct. 18, 1965, Ser.
No. 497,481
2 Claims. (Cl. 260—649)

The present application is a division of our copending application Ser. No. 216,029, filed Aug. 10, 1962, now Patent No. 3,281,469, the latter application being a continuation-in-part of our then copendent application, Ser. No. 175,796, filed Feb. 26, 1962, now abandoned.

This invention relates to a novel process for the preparation of intermediates useful for the synthesis of certain derivatives of dibenzo[a,d]cyclohepta[1.4]diene. More particularly, this invention relates to a novel process for the preparation of 5-(3-chloropropylidene)dibenzo[a,d]cyclohepta[1.4]diene.

Certain 5 - (3 - aminopropylidene)dibenzo[a,d]cyclohepta[1.4]dienes are valuable therapeutic agents useful in the treatment of depressive states. Currently available methods for the preparation of such compounds involve the use of a Grignard reagent in the preparation of intermediates necessary for the synthesis of such compounds. The relatively high cost of preparation of Grignard reagents and the hazards attendant upon their use, particularly in large quantities, have always been considered serious drawbacks to the employment of such reagents on a commercial scale. It is an object of this invention to provide intermediates for the synthesis of the above-mentioned antidepressive compounds, the preparation of which is not dependent upon the employment of Grignard reagents. It is a further object to provide such intermediates from relatively inexpensive starting materials. These and other objects of the invention will become more easily understood from the description of the invention provided herein.

In accordance with the invention, intermediates useful for the preparation of 5-(3-aminoalkylidene)dibenzo[a,d]cyclohepta[1.4]dienes are provided by a process, the distinguishing features of which are illustrated in the following reaction sequence:

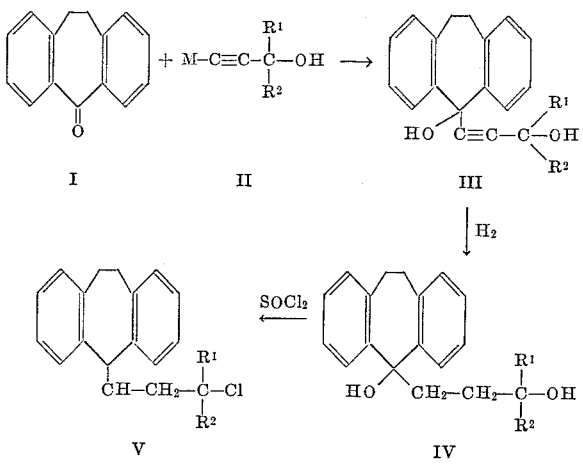

In the above scheme, M represents an alkali metal such as sodium, potassium, lithium, and the like; $R^1$ and $R^2$ when taken separately can be hydrogen or lower alkyl, and $R^1$ and $R^2$ when taken together with the carbon atom to which they are attached form a cycloaliphatic ring such as cyclobutyl, cyclopentyl, cyclohexyl, cycloheptyl, and the like. By the term "lower alkyl" as employed above is meant a straight or branched chain containing from one to four carbon atoms, such as methyl, ethyl, isopropyl, tertiary butyl, and the like.

In a preferred embodiment of the invention leading to the preparation of the desired haloalkylidene compound (V), a toluene solution containing both 5-ketodibenzo [a,d]cyclohepta[1.4]diene (I), and the acetylenic compound (II), is added to a suspension of sodium amide in liquid ammonia to produce first the sodium acetylide derivative, which subsequently reacts with the keto compound to form the sodium salt of a 5-hydroxy-5-(3-hydroxy-1-alkynyl)dibenzo[a,d]cyclohepta[1.4]diene (III). Alkali metals other than sodium, as for example potassium or lithium, can be used with equally good results. The metal salt is then hydrolyzed by treatment with water and the 5-hydroxy-5-(3-hydroxy-1-alkynyl) derivative is hydrogenated in the presence of a suitable catalyst, such as Raney nickel, palladium, or the like to produce a 5-hydroxy - 5 - (3 - hydroxyalkyl)dibenzo[a,d]cyclohepta [1.4]diene (IV).

The latter compound is a tertiary alcohol having a hydroxy-substituted alkyl group attached to the carbon atom carrying the tertiary alcohol group, and will, upon treatment with acid, lose a molecule of water to yield a 5 - (3 - hydroxyalkylidene)dibenzo[a,d]cyclohepta[1.4] diene. Subsequent replacement of the hydroxy groups in the dehydrated compound by halogen results in the formation of a 5-(3-haloalkylidene) derivative which can be caused to react with an appropriate amine to yield the desired end product, an aminoalkylidene dibenzo[a,d]cyclohepta[1.4]diene.

In carrying out the above-described process, a separate dehydration step can be avoided by treating the 5-hydroxy-5 - (3 - hydroxyalkyl)dibenzo[a,d]cyclohepta[1.4]diene (IV) directly with a halogenating agent such as thionyl chloride, phosphorus pentachloride, phosphorus tribromide, or the like. This treatment serves not only to substitute a halogen atom for the hydroxy group attached to the side chain, but also to dehydrate the tertiary alcohol to give the corresponding haloalkylidene compound directly.

A convenient method for carrying out the one-step dehydration-halogen substitution described in the preceding paragraph comprises adding thionyl chloride to a solution of the dihydroxy compound in the presence of a basic substance such as pyridine. The reaction is ordinarily driven to completion by heating the solution containing the reactants.

Although sodium is the preferred alkali metal and the use of sodium amide in liquid ammonia is the preferred method for forming the metallo derivative of the alkyne (II), other alkali metals and other methods for forming the metallo derivatives can be employed. Thus, for example, the lithium or potassium derivatives of the acetylenic compound can be employed in the synthesis with similar results. For the formation of the metallo acetylides, metal hydrides such as sodium hydride, potassium hydride, and the like, and metal alkyls or aryls, such as amylsodium, phenylsodium, butyllithium, and the like, in inert solvents such as benzene, toluene, diethyl ether, and the like, can be employed in place of the preferred sodium amide in liquid ammonia.

In order to illustrate more clearly the operation of the invention, the preparative procedures which follow are provided by way of example. Numerous modifications and variations will be apparent to those skilled in the art and are within the scope of the invention.

EXAMPLE 1

*5-hydroxy-5-(3-hydroxypropynyl)dibenzo[a,d] cyclohepta[1.4]diene*

A suspension of sodium amide in liquid ammonia is prepared from 9.2 g. of sodium in 250 ml. of liquid ammonia in a flask equipped with a Dry-Ice condenser. The addition of about 0.1 g. of hydrated ferric nitrate is beneficial in promoting the formation of sodium amide. To the stirred suspension there is added during the course of an hour a solution containing 11.2 g. of propargyl alcohol and 16.6g. of 5-ketodibenzo[a,d]cyclohepta[1.4]diene in 80 ml. of toluene. After the addition has been completed, the reaction mixture is stirred vigorously for an additional half-hour. The Dry-Ice condenser is then removed and stirring is continued for about eighteen hours longer while the reaction mixture is allowed to warm to room temperature and then ammonia evaporates. To the resulting mixture are added about 100 g. of ice and 100 ml. of toluene, stirring being maintained during the addition. The mixture is filtered and the solid product is washed with water. There are obtained 18.8 g. of 5-hydroxy-5-(3-hydroxypropynyl)dibenzo[a,d]cyclohepta[1.4]diene melting at 180–186° C. Evaporation of the filtrate allows the recovery of an additional gram of product as well as some unreacted starting ketone. Purification of the product is accomplished by recrystallization from alcohol. The purified material melts at about 192–195° C.

EXAMPLE 2

*5-hydroxy-5-(3-hydroxypropyl)dibenzo[a,d] cyclohepta[1.4]diene*

Hydrogenation of the 5 - hydroxy-5-(3-hydroxypropynyl)-dibenzo[a,b]cyclohepta[1.4]diene is accomplished as follows. One part by weight of the purified compound is suspended in about ten parts by volume of absolute alcohol and is subjected to a hydrogen pressure of 50 p.s.i. in the presence of about 3 percent by weight, based upon the propynyl compound, of a catalyst comprising 5 percent palladium on alumina. The temperature is maintained below 45° C. After the theoretical quantity of hydrogen has been absorbed, the catalyst is separated by filtration and the filtrate is evaporated to a syrup under vacuum. Addition of two parts by volume of toluene causes the crystallization of about one part by weight of 5-hydroxy-5-(3 - hydroxypropyl)dibenzo[a,d]cyclohepta[1.4]diene melting at about 82–86° C. This material contains toluene of solvation. Material recrystallized further from toluene and dried to constant weight in vacuo at 60° C. provides a sample suitable for analysis.

EXAMPLE 3

*5-(3-chloropropylidene)dibenzo[a,d]cyclohepta [1.4]diene*

A solution of 25.2 g. of 5-hydroxy-5-(3-hydroxypropyl)-dibenzo[a,d]cyclohepta[1.4]diene and 15.6 g. of pyridine in 100 ml. of chloroform is cooled to 2° C. and the temperature is maintained below 3° C. while 25.5 g. of thionyl chloride are added. The solution is heated to reflux temperature during one hour and is maintained at reflux for four additional hours. The reaction mixture is cooled, washed twice with water, and dried over anhydrous magnesium sulfate. After being filtered from the drying agent, the solution is evaporated to a thick syrup, which is crystallized from absolute ethanol to give 22.5 g. of 5-(3-chloropropylidene)dibenzo[a,d]cyclohepta [1.4]diene.

We claim:

1. The process for preparing a 5-(3-chloroalkylidene)-dibenzo[a,d]cyclohepta[1.4]diene which comprises heating under reflux an excess of thionyl chloride with a compound of the formula

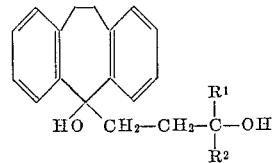

wherein $R^1$ and $R^2$, when taken separately, are hydrogen or $C_1$–$C_4$ alkyl, and $R^1$ and $R^2$, when taken together with the carbon to which they are attached, are $C_4$–$C_7$ cycloalkyl.

2. The process of claim 1 wherein $R^1$ and $R^2$ are hydrogen.

References Cited by the Examiner

UNITED STATES PATENTS

| | | | |
|---|---|---|---|
| 2,125,384 | 8/1938 | Macallum | 260—618 |
| 2,672,481 | 3/1954 | Weisler et al. | 260—617 |
| 2,764,619 | 9/1956 | Ikenberry et al. | 260—652 |
| 2,862,015 | 11/1958 | Kundiger et al. | 260—654 X |
| 2,919,281 | 12/1959 | Chodroff et al. | 260—618 |
| 3,134,820 | 5/1964 | Davis et al. | 260—618 |
| 3,167,564 | 1/1965 | Yura | 260—654 X |
| 3,183,240 | 5/1965 | Yura | 260—654 X |
| 3,189,657 | 6/1965 | Mills | 260—649 |

OTHER REFERENCES

Morrison et al.: Organic Chemistry (1959), pages 168 and 335.

Fieser: Advanced Organic Chemistry, New York, Reinhold 1961, pages 326–27.

LEON ZITVER, *Primary Examiner.*

T. GENE DILLAHUNTY, N. J. KING,
*Assistant Examiners.*